(12) United States Patent
Arao

(10) Patent No.: US 6,356,368 B1
(45) Date of Patent: Mar. 12, 2002

(54) OPTICAL SUPERVISORY TRANSMISSION SIGNAL CONTROL DEVICE

(75) Inventor: Hideaki Arao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/249,045

(22) Filed: Feb. 12, 1999

(30) Foreign Application Priority Data

Feb. 19, 1998 (JP) .......................................... 10-037102

(51) Int. Cl.$^7$ ................................................ H04J 14/02
(52) U.S. Cl. ...................................... 359/124; 359/110
(58) Field of Search .................................. 359/110, 124

(56) References Cited

U.S. PATENT DOCUMENTS 5,383,046 A * 1/1995 Tomofuji et al. ............ 359/110
5,841,558 A * 11/1998 Tamura et al. .............. 359/124

FOREIGN PATENT DOCUMENTS

| JP | 1-204541 | 8/1989 |
| JP | 4-172035 | 6/1992 |
| JP | 8-79244 | 3/1996 |

* cited by examiner

*Primary Examiner*—Kinfe-Michael Negash
(74) *Attorney, Agent, or Firm*—Staas & Halsey LLP

(57) ABSTRACT

In a control device for processing an optical supervisory transmission signal necessary for network management between transmission devices in a wavelength-multiplexed optical transmission system, there is provided a main signal device that amplifies a main signal light which is wavelength-multiplexed. A supervisory control device processes supervisory control information. A transmission path connects the main signal device and the supervisory control device. The supervisory control information is defined by mapping items of data of the optical supervisory transmission signal into an overhead defined in another optical transmission system. The main signal device converts the optical supervisory transmission signal dropped from the main signal light into the supervisory control information, which is sent to the supervisory control device. The supervisory control device processes the supervisory control information received as the overhead.

12 Claims, 15 Drawing Sheets

FIG. 5

| OSC | | FUNCTION | TERMINATION POINT | | |
|---|---|---|---|---|---|
| NO | NAME | FUNCTION NAME | FUNCTION | MTRIX | HED | TEDs |
| 1 | J0 | SECTION TRACE | | | ◎ | |
| 2 | E1 | LOCAL ORDER WIRE | | ◎ | | |
| 3 | E1#2 | LOCAL OW CUT | | | ◎ | |
| 4 | F1 | USER CHANNEL | NCC CLEAR CHANNEL CORRESPONDENCE (RS-422 SUPPORT AVAILABLE) | ◎ | ○ | |
| 5 | D1 | DCC | | ◎ | | |
| 6 | D2 | DCC | | ◎ | | |
| 7 | D3 | DCC | | ◎ | | ○ |
| 8 | R0 | SECTION RESERVE OB | EXTENDED BYTE | | | |

◎ : WAY OF USE AS SYSTEM
○ : HARDWARE THAT CAN BE SUPPORTED AS SYSTEM

FIG. 6

| OSC | | FUNCTION | | TERMINATION POINT | | |
|---|---|---|---|---|---|---|
| NO | NAME | FUNCTION NAME | FUNCTION | MTRIX | HED | TEDs |
| 9 | OAIS | OSC ALARM INDICATOR SIGNAL | OSC-AIS | | ◎ | ○ |
| 10 | SDI | SHUTDOWN INDICATOR | TRANSMITTER LOL RECEPTION INFORMATION | | ◎ | ○ |
| 11 | E2 | EXTRA ORDER WIRE | | ○ | | |
| 12 | TC | TIME CONTROL BYTE (NTT FUNC) | TIME SET TRIGGER BYTE (NTT) | | ◎ | |
| 13 | WCF1 | WDM CHANNEL FAILURE BYTE 1 | WDM CHANNEL FAILURE INFORMATION CH1~CH8 | | | ◎ |
| 14 | WCF2 | WDM CHANNEL FAILURE BYTE 2 | WDM CHANNEL FAILURE INFORMATION CH9~CH16 | | | ◎ |
| 15 | WCF3 | WDM CHANNEL FAILURE BYTE 3 | WDM CHANNEL FAILURE INFORMATION CH17~CH24 | | | ◎ |
| 16 | WCF4 | WDM CHANNEL FAILURE BYTE 4 | WDM CHANNEL FAILURE INFORMATION CH25~CH32 | | | ◎ |

◎ : WAY OF USE AS SYSTEM

○ : HARDWARE THAT CAN BE SUPPORTED AS SYSTEM

FIG. 7

| OSC | | FUNCTION NAME | FUNCTION | TERMINATION POINT | | | |
|---|---|---|---|---|---|---|---|
| NO | NAME | | | MTRIX | HED | TEDs | |
| 17 | R1R1 | RESERVE INTERRUPT REGISTER 1 | CPU INTERRUPT PROCESS RESERVE BYTE 1 | ○ | ○ | | |
| 18 | R1R2 | RESERVE INTERRUPT REGISTER 2 | CPU INTERRUPT PROCESS RESERVE BYTE 2 | ○ | ○ | | |
| 19 | R1 | RESERVE BYTE 1 | RESERVE BYTE 1 | | | ○ | |
| 20 | R2 | RESERVE BYTE 2 | RESERVE BYTE 2 | | | ○ | |
| 21 | R3 | RESERVE BYTE 3 | RESERVE BYTE 3 | | | ○ | |
| 22 | R4 | RESERVE BYTE 4 | RESERVE BYTE 4 | | | ○ | |
| 23 | MB | MULTIFRAME BYTE | MULTIFRAME BYTE (*1) | | | ◎ | |
| 24 | CK | SUBFRAME CHECKER | BIP-8 | | | ◎ | |

◎ :WAY OF USE AS SYSTEM
○ :HARDWARE THAT CAN BE SUPPORTED AS SYSTEM
(*1) F1-F4:WCR(WDM CH RATE)   /4BYTES
     F5-F8:WCS(WDM CH STATUS)/4BYTES
     F9-F24:RESERVED          /16BYTES

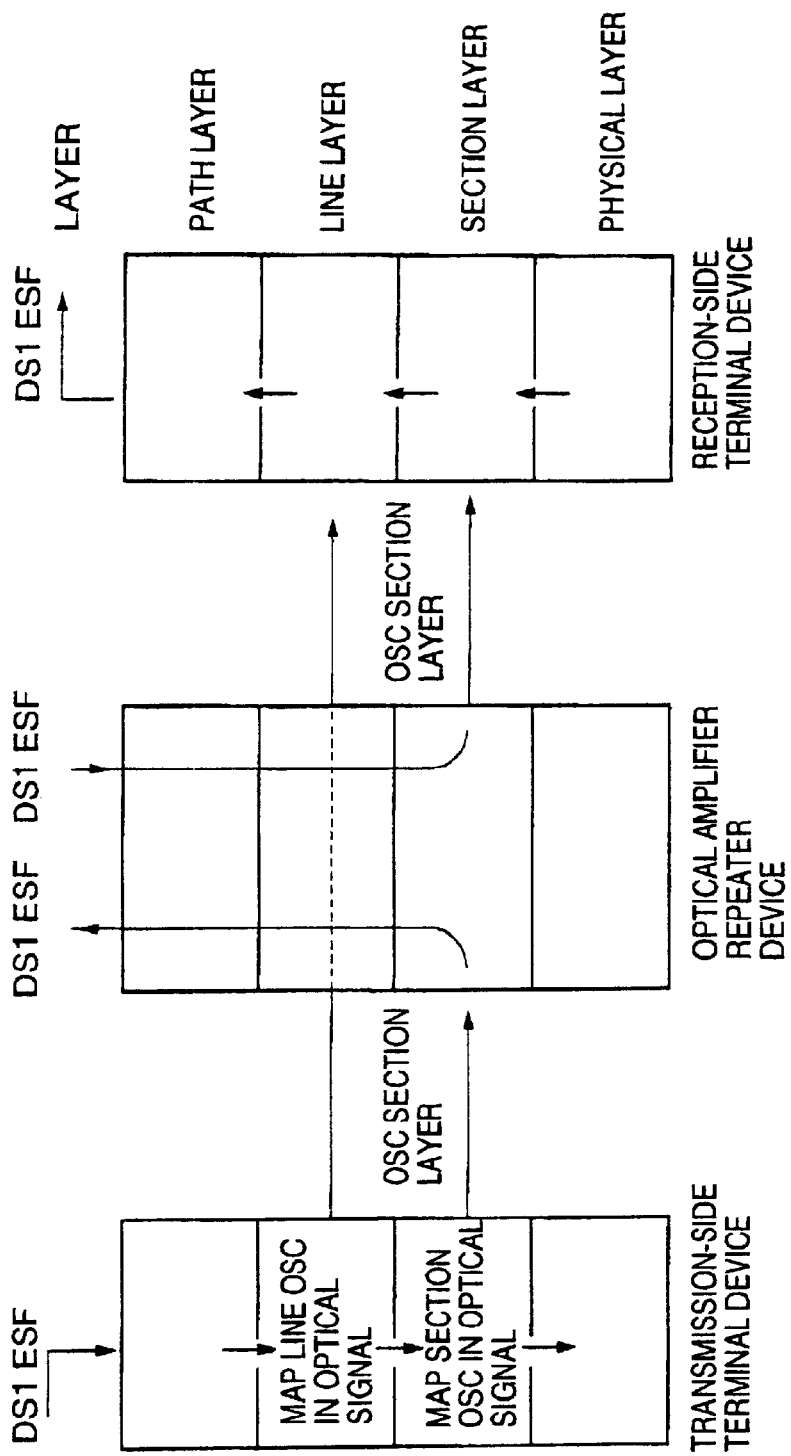

HE (D7):HEC CORRECT
HEC (D4):HEC ERROR

OPTICAL SUPERVISORY TRANSMISSION SIGNAL CONTROL DEVICE

BACKGROUND OF THE INVENTION

1. Field of the Invention

The present invention generally relates to wavelength division multiplexing systems (WDM systems), and more particularly an optical supervisory transmission signal control device necessary for network management when an optical transmission takes place between a transmission-side terminal device and a reception-side terminal device via an optical amplifier/repeater device.

2. Description of the Related Art

Recent data transmission has been required to transfer data at an extremely high speed over a long distance. In addition, such data transmission has been required to be implemented by a low-cost system such as a WDM system.

The WDM system generally includes a transmission-side terminal device, an optical amplifier/repeater device, and a reception-side terminal device. The terminal device on the transmission side wavelength-multiplexes a plurality of signal lights having mutually different wavelengths and sends a multiplexed optical signal to an optical fiber. The optical amplifier/repeater device is placed in the way of the optical fiber transmission path in order to realize long-distance transmission. The terminal device on the reception side receives the multiplexed optical signal from the transmission path and wavelength-demultiplexes the received optical signal.

In the WDM system, an optical supervisory channel frame having a wavelength different from the wavelengths of the signal lights is transferred between the devices in order to control the gains of optical amplifiers of the devices. Hereinafter, the optical supervisory channel frame will be abbreviated as OSC frame. The OSC frame is used to inform the optical amplifiers of the devices of supervisory control information concerning respective input signals applied to the optical amplifiers. Hence, the gains of the optical amplifiers are controlled.

In the WDM system, an in-service migration is taken into account in the terminal device on the transmission side when or after the WDM system is built up. The in-service migration means that channels to be wavelength-multiplexed are added or channels are altered to accommodate signals having different bit rates. In this case, it is important to perform, from the remote side, setting of provisioning for gain control of the optical amplifier in the optical amplifier/repeater device or the reception-side terminal.

In ordinary optical transmission systems that do not perform wavelength multiplexing, the role of the above-mentioned OSC frame is played by data placed in an overhead (OH). The OSC frame has a different specification and format from the OH data. Hence, the OSC frame cannot be handled in conventional supervisory control blocks which handle the OH data. Thus, the conventional WDM system be required to develop a particular supervisory control block capable of controlling the OSC frame.

In practice, it is very advantageous, even in terms of cost, to develop functions commonly used for various applications that are required to build networks. In this regard, it is required that the supervisory control block which handles the OSC frame is unified with the block that handles the OH data and can thus handle the OH data.

For example, a network shown in FIG. 1 will be considered. In the network, nodes use both the WDM system using the OSC frame as the supervisory control information and the ordinary optical transmission system using the OH data as the supervisory control information. In this case, the supervisory control blocks of the nodes are required to be capable of processing both the OSC frame and the OH data. In this case, merely adding software directed to realizing the function of processing data contained in the OSC frame to the supervisory control block capable of handling the OH data may be considered. However, this will increase the load on CPUs of the supervisory control blocks, and software executed by the CPU will be restricted.

In the conventional WDM system, DCC, order wire, and multiplexed wavelength information are processed in the supervisory control blocks. The DCC and the order wire employ an interface synchronized with a clock. Hence, the supervisory control blocks have a large number of wires for electrical connections. In practice, the interface is formed by a number of boards that are arranged in a stacked formation.

SUMMARY OF THE INVENTION

It is a general object of the present invention to provide an optical supervisory transmission signal (frame) control device in which the above disadvantages are eliminated.

A more specific object of the present invention is to provide an optical supervisory transmission signal control device which can use a wavelength-multiplexed optical transmission system and another optical transmission system without increasing software executed in a processor provided in a supervisory control block.

The above objects of the present invention are achieved by a control device for processing an optical supervisory transmission signal necessary for network management between transmission devices in a wavelength-multiplexed optical transmission system, the above control device comprising: a main signal device that amplifies a main signal light which is wavelength-multiplexed; a supervisory control device that processes supervisory control information; and a transmission path connecting the main signal device and the supervisory control device. The supervisory control information is defined by mapping items of data of the optical supervisory transmission signal into an overhead defined in another optical transmission system. The main signal device converts the optical supervisory transmission signal dropped from the main signal light into the supervisory control information, which is sent to the supervisory control device. The supervisory control device processes the supervisory control information received as the overhead.

The control device may be configured so that the main signal device converts the supervisory control information received from the supervisory control device into the optical supervisory transmission signal, which is added to the main signal light.

The control device may be configured so that the main signal device comprises: a generation/termination part which performs a conversion between the supervisory control information and the optical supervisory transmission signal; and a transmission part which transfers the supervisory control information between the main signal device and the supervisory control device, wherein an interface between the generation/termination part and the transmission part includes a start-stop synchronization in which a start bit, a parity bit and a stop bit are added to the supervisory control information.

The control device may be configured so that the transmission path is an ATM transmission path over which an ATM cell is transferred between the main signal device and the supervisory control device.

The control device may be configured so that the main signal device receives an ATM cell in which the supervisory control information is arranged from the supervisory control device, and sends the supervisory control information arranged in the received ATM cell to a generation/termination part of the main signal device, which supervisory control information corresponds to information arranged in a header of the received ATM cell.

The control device may be configured so that the main signal device comprises: a first part that receives an ATM cell in which the supervisory control information is arranged from the supervisory control device; a second part that determines whether a fault has occurred in the transmission path by referring to a fault detection signal related to the transmission path and included in the ATM cell; and a third part that fixes, if occurrence of a fault is detected, the supervisory control information to be sent to a generation/termination part of the main signal device to that obtained before the fault occurred.

The control device may be configured so that the main signal device comprises: a first part that receives an ATM cell in which the supervisory control information is arranged from the supervisory control device; a second part that determines whether a fault has occurred in the transmission path by referring to error check data included in the ATM cell; and a third part that maps, if an error is detected, error information in an ATM cell, which is sent to the supervisory control device.

BRIEF DESCRIPTION OF THE DRAWINGS

Other objects, features and advantages of the present invention will become more apparent from the following detailed description when read in conjunction with the accompanying drawings, in which:

FIGS. 5, 6 and 7 are respectively diagrams showing an OSC byte assignment used in an OSC frame in the DS1 interface;

FIG. 8 is a diagram illustrating a function layer of an OSC link;

DESCRIPTION OF THE PREFERRED EMBODIMENTS

Figure 1:
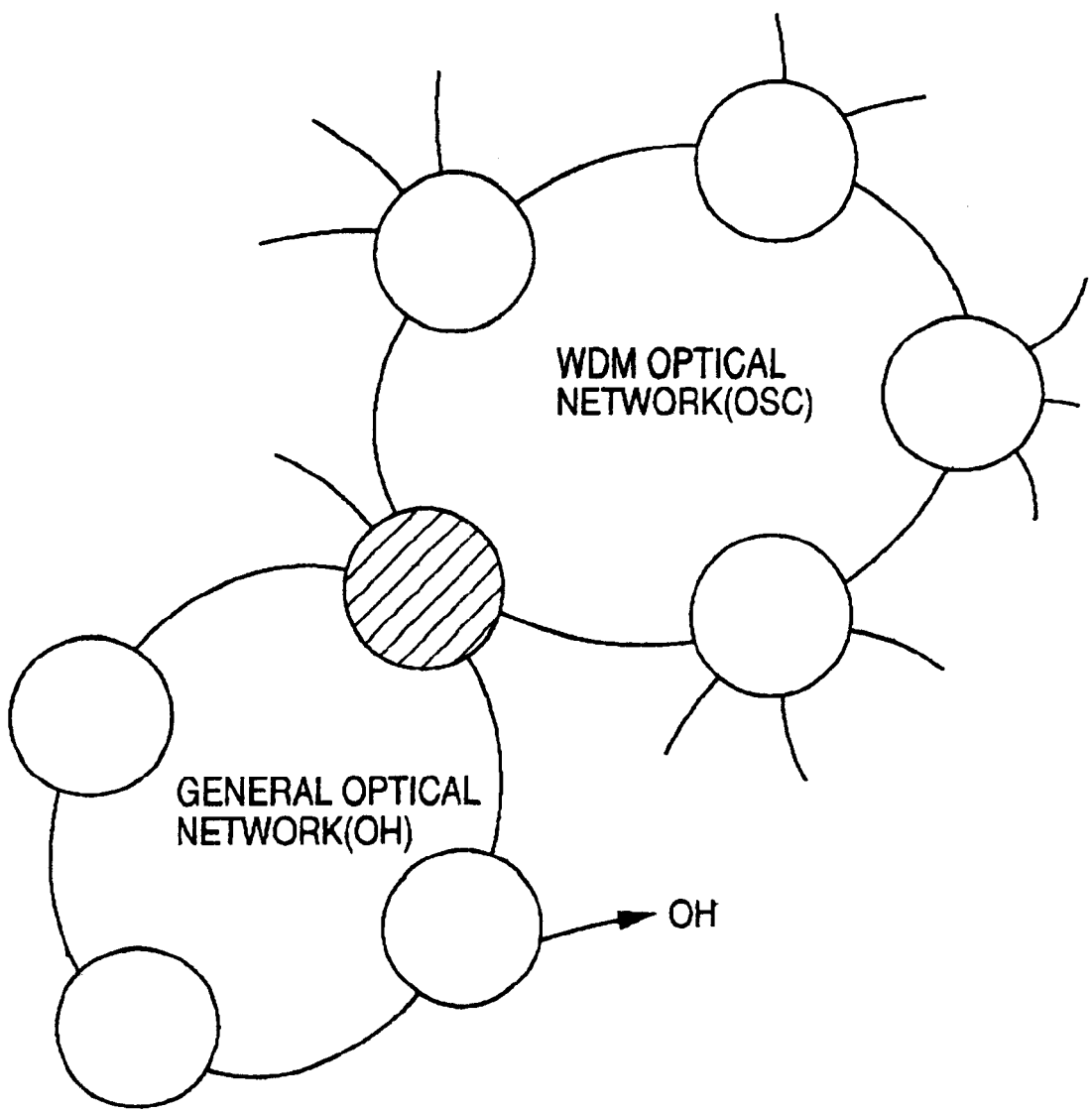
FIG. 1 is a diagram showing a coexistence of a WDM system and an ordinary optical transmission system.
Figure 2:
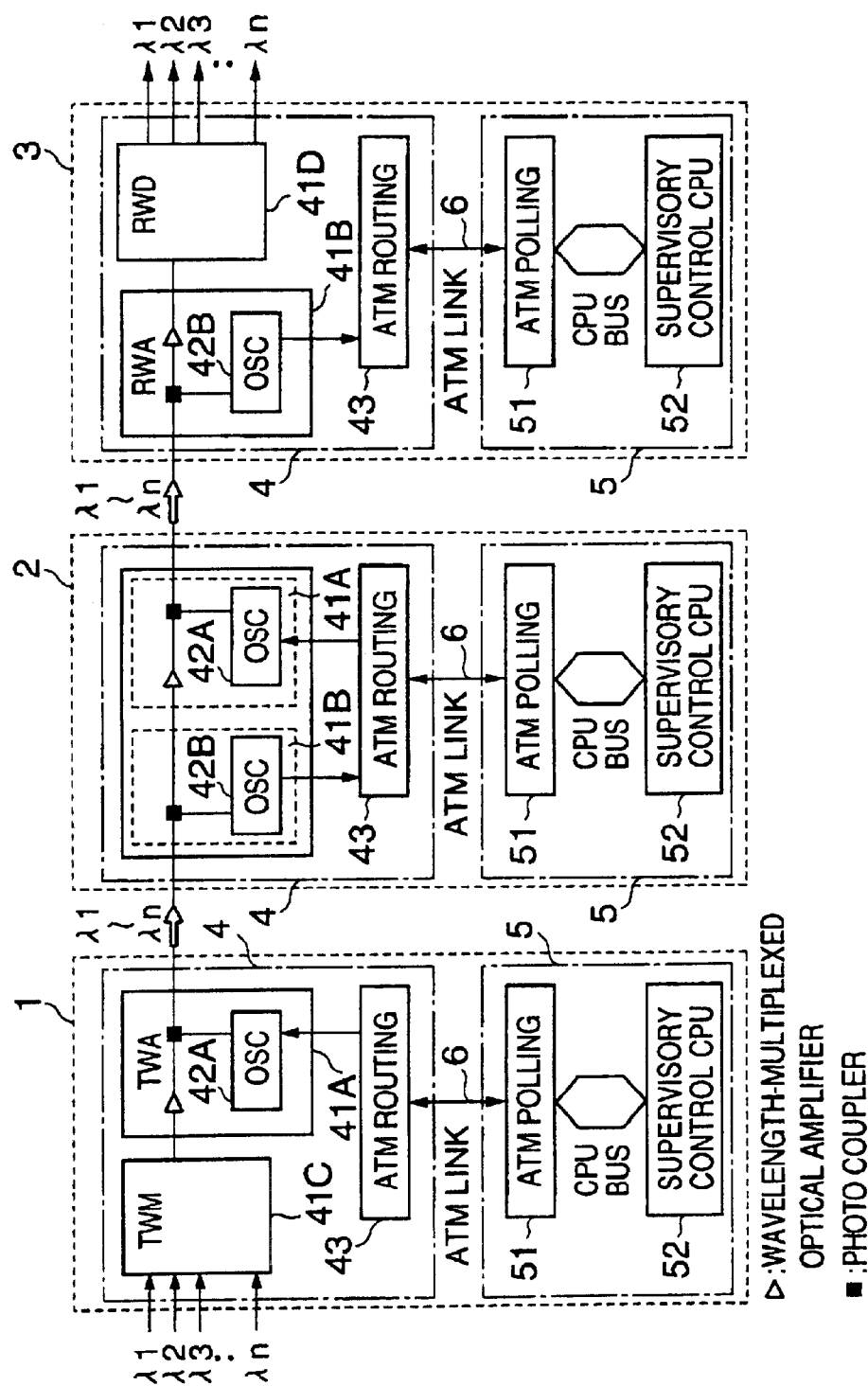
FIG. 2 is a block diagram of a WDM system using an OSC frame control device according to a embodiment of the present invention.

FIG. 2 is a block diagram of a WDM system using an OSC frame control device according to an embodiment of the present invention. A node to which the device shown in FIG. 2 is connected can be a node in the WDM system or a node in a general optical transmission system, as shown in FIG. 1.

Referring to FIG. 2, a transmission-side terminal device 1 wavelength-multiplexes n signal lights (n is a positive integer equal to or less than 32) of mutually different wavelengths $\lambda 1-\lambda n$, and sends a wavelength-multiplexed signal to an optical fiber. An optical amplifier/repeater device 2 is provided in the way of the transmission path in order to increase the transmission distance. The optical amplifier/repeater device 2 amplifies the signal light (wavelength-multiplexed signal light) received from the optical fiber in accordance with the OSC frame, and sends the amplified signal light to the device of the next stage. A reception-side terminal device 3 receives the signal light from the optical fiber and demultiplexes it to n signal lights having wavelengths $\lambda 1-\lambda n$.

The control device of the present invention is applied to the transmission-side terminal device 1, the optical amplifier/repeater device 2 and the reception-side terminal device 3.

A description will now be given of a structure of the control device. Although FIG. 1 shows that the transmission-side terminal device 1 and the reception-side terminal device 3 have different structures, in practice each terminal device includes both the structure of the transmission-side terminal device 1 and that of the reception-side terminal device 3 illustrated in FIG. 2. A terminal device that will be described with reference to FIGS. 3 and 4 has both the transmission function and the reception function.

Figure 3:
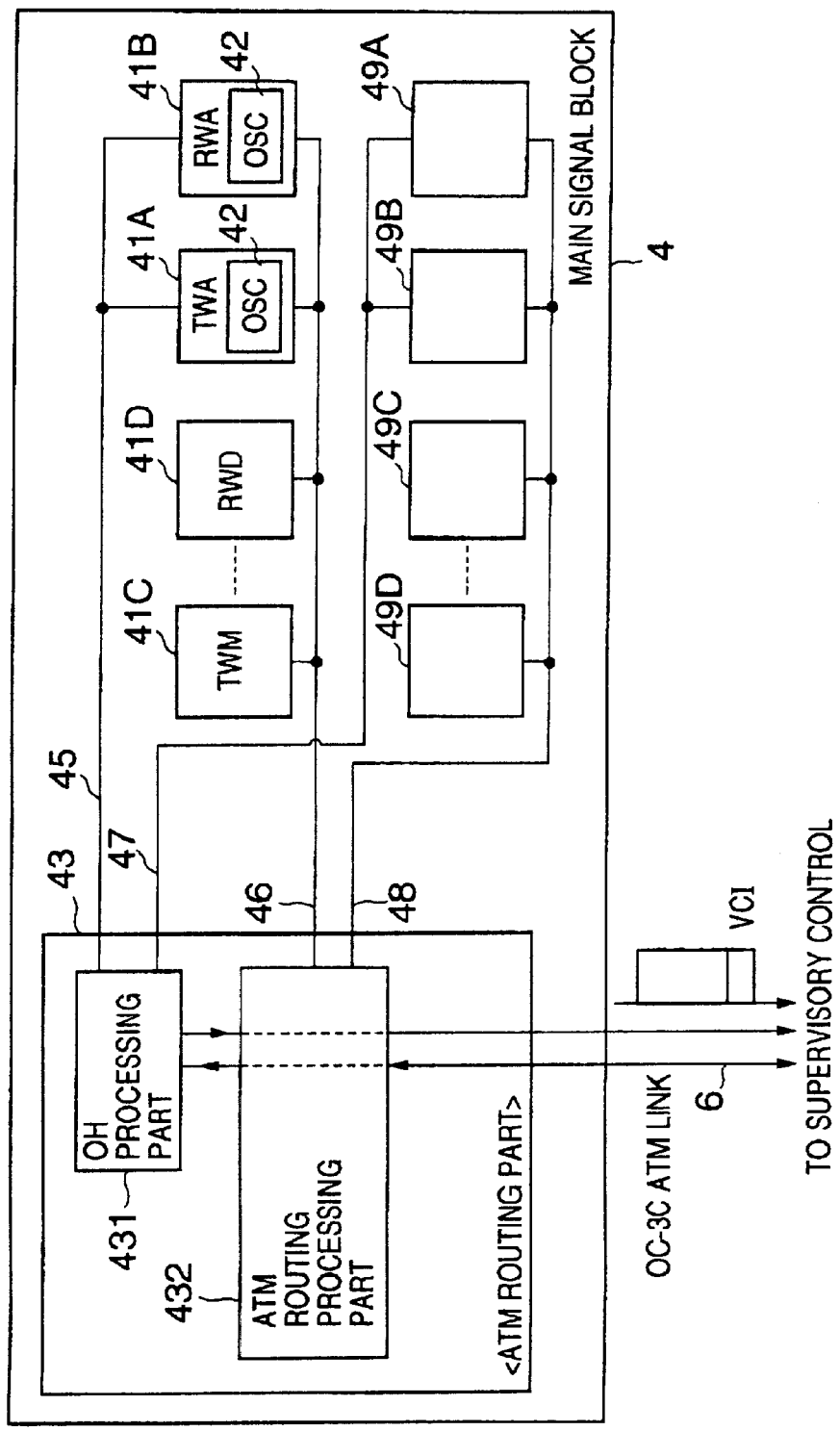
FIG. 3 is a block diagram of a main signal block in a terminal device according to the embodiment of the present invention.
Figure 4:
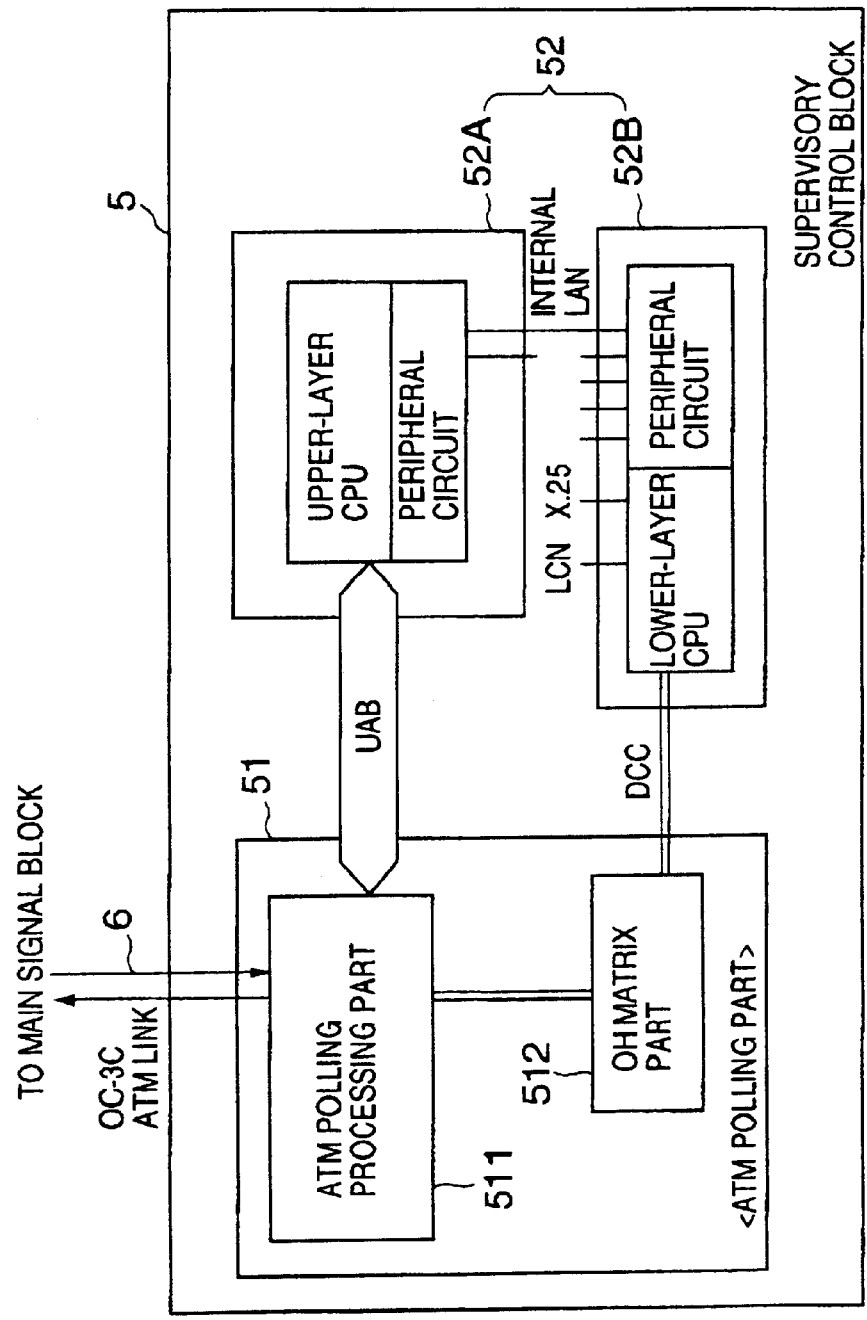
FIG. 4 is a block diagram of a supervisory control block in the terminal device according to the embodiment of the present invention.

As shown in FIG. 2, each terminal device is generally made up of a main signal block 4, a supervisory control block 5, and an ATM link 6 (ATM is an abbreviation of Asynchronous Transfer Mode). The main signal block 4 has an add/drop function, an optically amplifying function, and a wavelength multiplexing and demultiplexing function. The add-drop function is to add the OSC frame to the signal light (wavelength-multiplexed signal light) and drop it therefrom. The supervisory control block 5 processes OSC information and OH information. The ATM link 6 connects the blocks 4 and 5 together at a bit rate of 155 Mbps. FIG. 3 shows a detailed structure of the main signal block 4, and FIG. 4 shows a detailed structure of the supervisory control block 5.

As shown in FIG. 3, the main signal block 4 is equipped with circuits 41A–41D for the WDM system using the OSC frame as supervisory control information, and is also equipped with circuits 49A–49D for an ordinary optical transmission system using the OH data as the supervisory control information. The circuits 41A and 41B, which are optical amplifier parts, include a multi-wavelength optical amplifier for amplifying the signal light, a photocoupler, and an OSC frame generation/termination part. The circuits 41A–41D are connected to a network of the WDM system. The circuits 49A–49D are connected to a network of an ordinary transmission system such as a SONET/SHD. That is, the main signal block 4 can handle both the WDM system and the ordinary optical transmission system.

The main signal block 4 is equipped with an ATM routing part 43, which includes an OH processing part 431 and an ATM routing processing part 432. The ATM routing processing part 432 performs a transmission/reception operation on signals via an ATM interface 46 with regard to the circuits 41A–41D for the WDM system, and performs a transmission/reception operation on signals via an ATM interface 48 with regard to the circuits 49A–49D for the ordinary optical transmission system.

The OH processing part 431 performs a transmission/reception operation on OSC information (which will be described in detail later) via an OSC interface 45 with respect to given circuits which need an add/drop operation on the OSC frame among the circuits for the WDM system. In FIG. 3, such circuits which need the add/drop operation on the OSC frame are the transmission-side optical amplifier 41A and the reception-side optical amplifier 41B. Further, the OH processing part 431 performs a transmission/reception operation on OH information via an OH interface 47 with respect to given circuits which need an add/drop operation on the OH frame among the circuits for the ordinary optical transmission system. In FIG. 3, such circuits which need the add/drop operation on the OH frame are the circuits 49A and 49B. The OSC interface 45 is a transmission path which forms a serial-data interface between the OSC information and the main signal system, and has a bit rate of 19.44 MHz.

The transmission-side optical amplifier part 41A and the reception-side optical amplifier part 41B have respective OSC frame generation/termination parts 42 (42A, 42B). Each of the OSC frame generation/termination parts 42 has both an OSC frame creating function for transmission and an OSC frame termination function for reception so that each part 42 can be applied commonly to the transmission side and the reception side. More particularly, the OSC frame generation/termination part 42 of the reception-side optical amplifier part 41B generates OSC information by converting the OSC frame dropped from the wavelength-multiplexed signal light through the photocoupler into an electric signal and by mapping a plurality of OSC bytes that form the dropped OSC frame into the format of the OH frame (hereinafter the above format will be referred to as a new OH format). Then, the OSC frame generation/termination part 42 sends the OSC information thus generated to the OH processing part 431 via the OSC interface 45. The OSC frame generation/termination part 42 of the transmission-side optical amplifier part 41A maps the OSC information (new OH frame) received from the OH processing part 431 via the OSC interface 45 into the OSC bytes in the format of the OSC frame, and converts the OSC frame into an optical signal, which is then inserted into the wavelength-multiplexed signal light through the optical coupler.

A description will now be given of the OSC information formed by the format of the new OH frame. FIGS. 5, 6 and 7 show an assignment of 24 OSC bytes numbered from 1 to 24 and used in the OSC frame of the DS1 interface. These figures show, for each of the 24 OSC bytes, a name, a function name, a function and termination point. As to the termination point, MTRIX denotes an OH matrix part 512 of the supervisory control block 5, and HED denotes an ATM polling processing part 511 of the supervisory control block 5. Further, TEDs denotes a circuit in the OSC frame generation/termination part 42.

FIG. 8 shows function layers of the OSC link. As shown in FIG. 8, an OSC line layer and an OSC section layer are generated and terminated in sections that are changed in accordance with the type of data contained in the OSC bytes. Normally, the OSC bytes do not have any layer segmentation. However, the layer segmentation can virtually be made based on the functions of the respective items of the OSC data.

Figure 9:
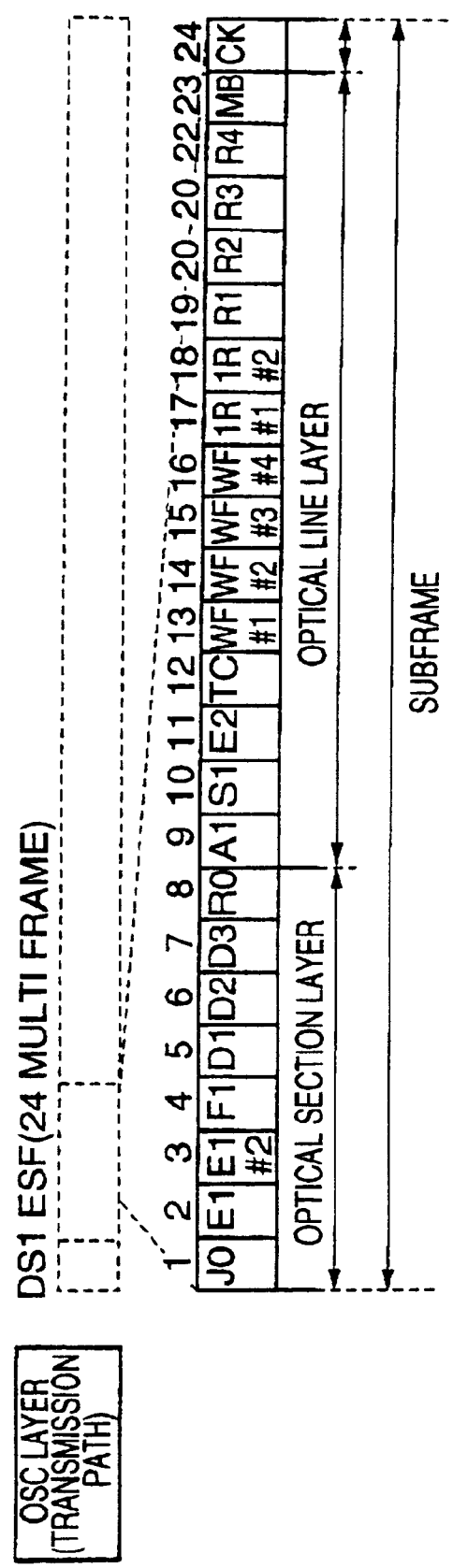
FIG. 9 is a diagram showing an OSC byte frame format.

FIG. 9 shows that the assignment of the OSC bytes is divided into the OSC line layer and the OSC section layer. As shown in FIG. 9, the OSC frame of the DS1-ESF has a 24 multiframe structure consisting of 24 subframes, and only one thereof is illustrated in FIG. 9 in detail. Each of the subframes of the DS1-ESF consists of 24 bytes, and OSC bytes of the subframes numbered from 1 to 8 are grouped as an optical section layer. In other words, the optical section layer includes eight OSC bytes named JO, E1, E1#2, F1, D1, D2, D3 and R0. The OSC bytes numbered from 9 to 23 are grouped as an optical line layer. In other words, the optical line layer includes 15 OSC bytes named A1, S1, E2, TC, WF#1, WF#2, WF#3, WF#4, IR#1, IR#2, R1, R2, R3, R4, and MB.

Figure 10:
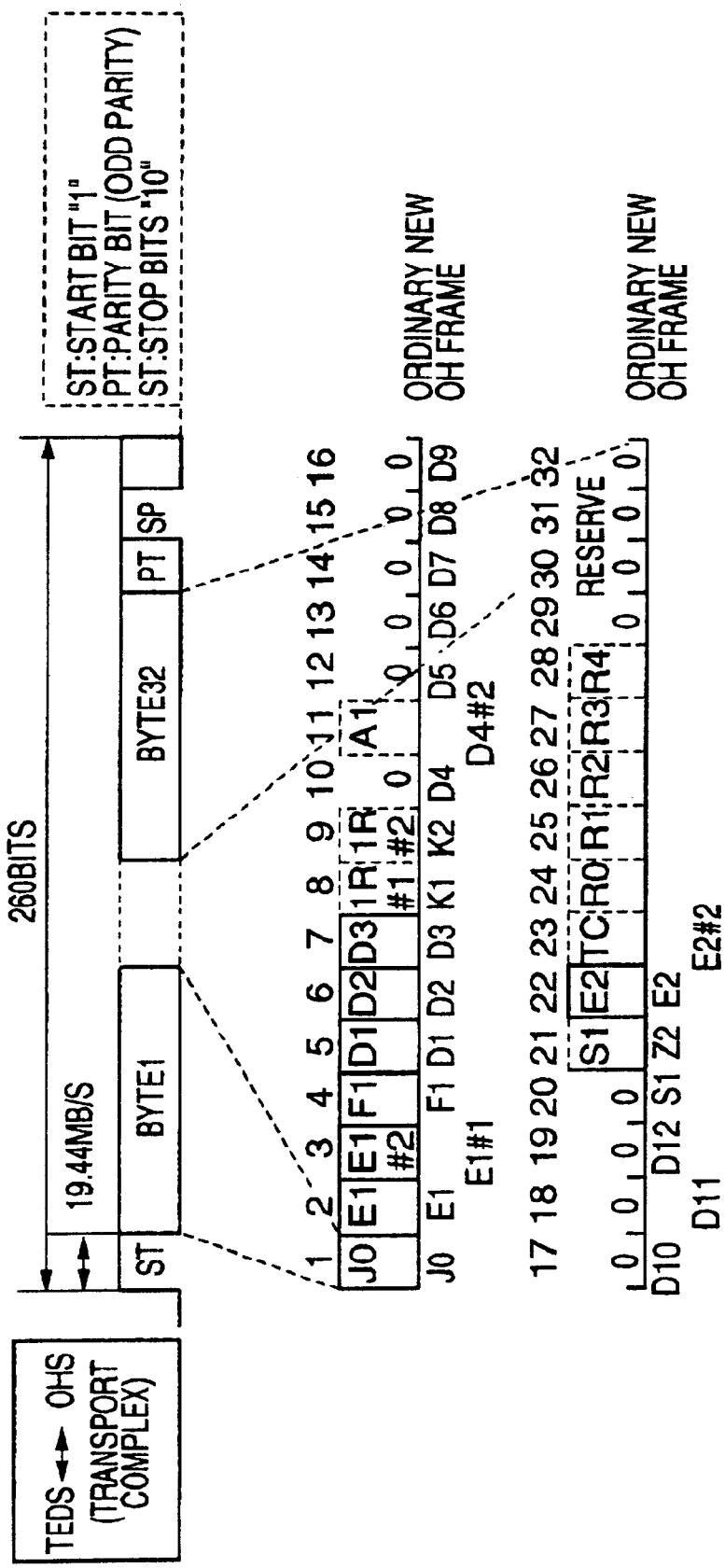
FIG. 10 is a diagram showing an OH frame format.

As described above, each OSC subframe is grouped into the line layer and the section layer, and is further mapped into the OH frame format defined in the general SONET/SDH as shown in FIG. 10. As has been described previously, a frame obtained by mapping the OSC bytes into the OH frame is referred to as a new OH frame. The above conversion using the mapping makes it possible to process, in the supervisory control block 5, the OSC bytes defined in the WDM system in the same manner as the OH frame defined in the general SONET/SDH without any increase in hardware.

The new OH format shown in FIG. 10 will be described in detail. One frame consists of 260 bits including a data field of 32 bytes, a one-bit start bit ST ("1" in the normal state) inserted at the leading end of the data field, a one-bit parity bit PT (odd parity), and stop bits SP of two bits ("10" in the normal state). As shown by comparatively small letters and numbers in FIG. 10, the OH frame defined in the SONET/SDH includes each of bytes 1–bytes 32, data named JO, E1, E1#1, F1, D1, D2, D3, K1, K2, D4, D4#2, D5, D6, D7, D8, D9, D10, D11, D12, S1, Z2, E2 and E2#2. In the OH frame, data is arranged in layered formation as in the case of the OSC frame.

In the new OH frame used in the invention, the bytes JO, E1, E1#2, F1, D1, D2 and D3 of the OSC byte frame format are respectively mapped into the byte 1–byte 7 of the new OH frame format, and the bytes IR#1 and IR#2 are respectively mapped into byte 8 and byte 9. Further, the byte A1 is mapped in byte 11, and the bytes S1, E2, TC, R0, R1, R2, R3 and R4 are respectively mapped in byte 21–byte 28. Further, "0" is placed in the remaining bytes.

The new OH frame is transferred, as OSC information, between the OH processing part 431 and the OSC frame generation/termination parts 42 of the optical amplifier parts 41A and 41B via the OSC interface 45. The OSC interface 45 is a transmission path via which a serial transfer can be performed at an interface speed of 19.44 MHz, and employs a start-stop synchronization system.

The new OH frame has the format in which the start bit ST, the parity bit PT and stop bits SP are added. If an error is detected in any bit, the OSC information is inhibited from being taken in the devices. Hence, the quality of the OSC control can be improved. For example, the occurrence of an error in the OSC information can be detected by using the parity bit PT. Further, FIGS. 11A and 11B show two processing systems for inhibiting the OSC information from being taken in when a fault occurs in the OSC interface 45 between the OSC frame generation/termination part 42 and the OH processing part 431 in the ATM routing part 43 and is detected.

Figure 11A:
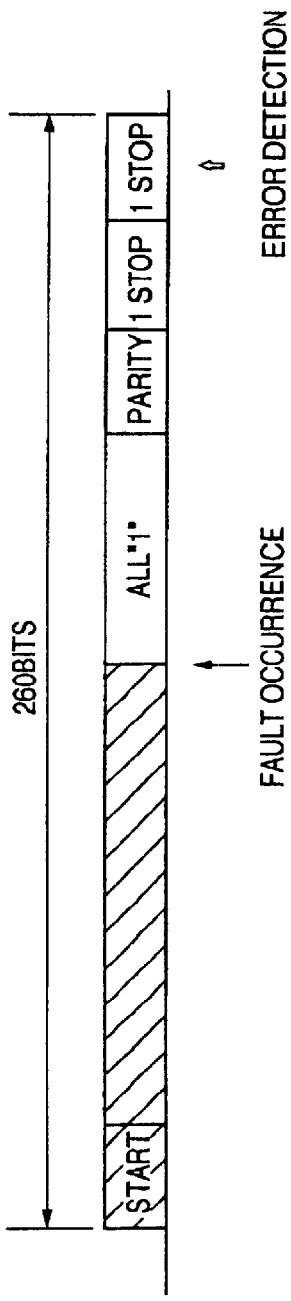
FIGS. 11A and 11B are diagrams showing OSC data processes executed when a fault occurs in an interface between an OSC frame generation/termination part and an OH processing part according to the embodiment of the present invention.

More particularly, FIG. 11A shows that a pull-up circuit is added to the OSC interface 45. In this case, "0" bits in the OSC information are pulled up to "1" when a fault occurs. Hence, the second bit "0" of the stop bits SP "10" in the OSC information is pulled up to "1". By detecting the above change, it is possible to recognize the occurrence of a fault and inhibit the OSC information from being taken in.

Figure 11B:
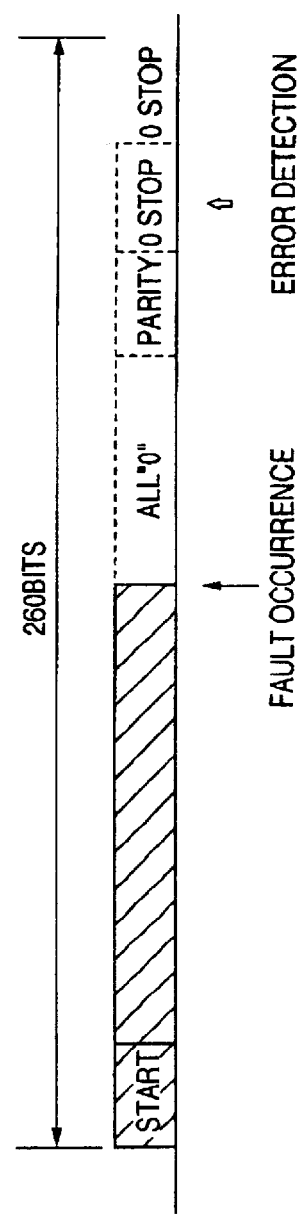

FIG. 11B shows that a pull-down circuit is added to the OSC interface 45. In this case, "1" bits in the OSC information are pulled down to "0" when a fault occurs. Hence, the first bit "1" of the stop bits SP "10" in the OSC information is pulled down to "0". By detecting the above change, it is possible to recognize the occurrence of a fault and inhibit the OSC information from being taken in.

As described above, by handling the stop bits SP as detection bits "10" formed by the combination of "1" and "0", it is possible to definitely detect the occurrence of a fault and thus perform the take-in/inhibit control of the OSC information irrespective of whether the OSC interface 45 is equipped with the pull-up system or the pull-down system.

The OH processing part 431 maps the OSC information (new OH frame) received from the OSC interface 45 into ATM cell data, which is sent to the ATM routing processing part 432. Further, the OH processing part 431 maps ATM cell data received from the ATM routing processing part 432 into the new OH frame, which is sent to the OSC interface 45.

The ATM routing processing part 432 adds the header, HEC and CRC to the ATM cell data received from the OH processing part 431 so that an ATM cell is assembled. The ATM cell thus assembled is sent to the ATM link 6. The ATM routing processing part 432 disassembles an ATM cell received from the ATM link 6 into ATM cell data, which is then sent to the OH processing part 431.

Figure 12:
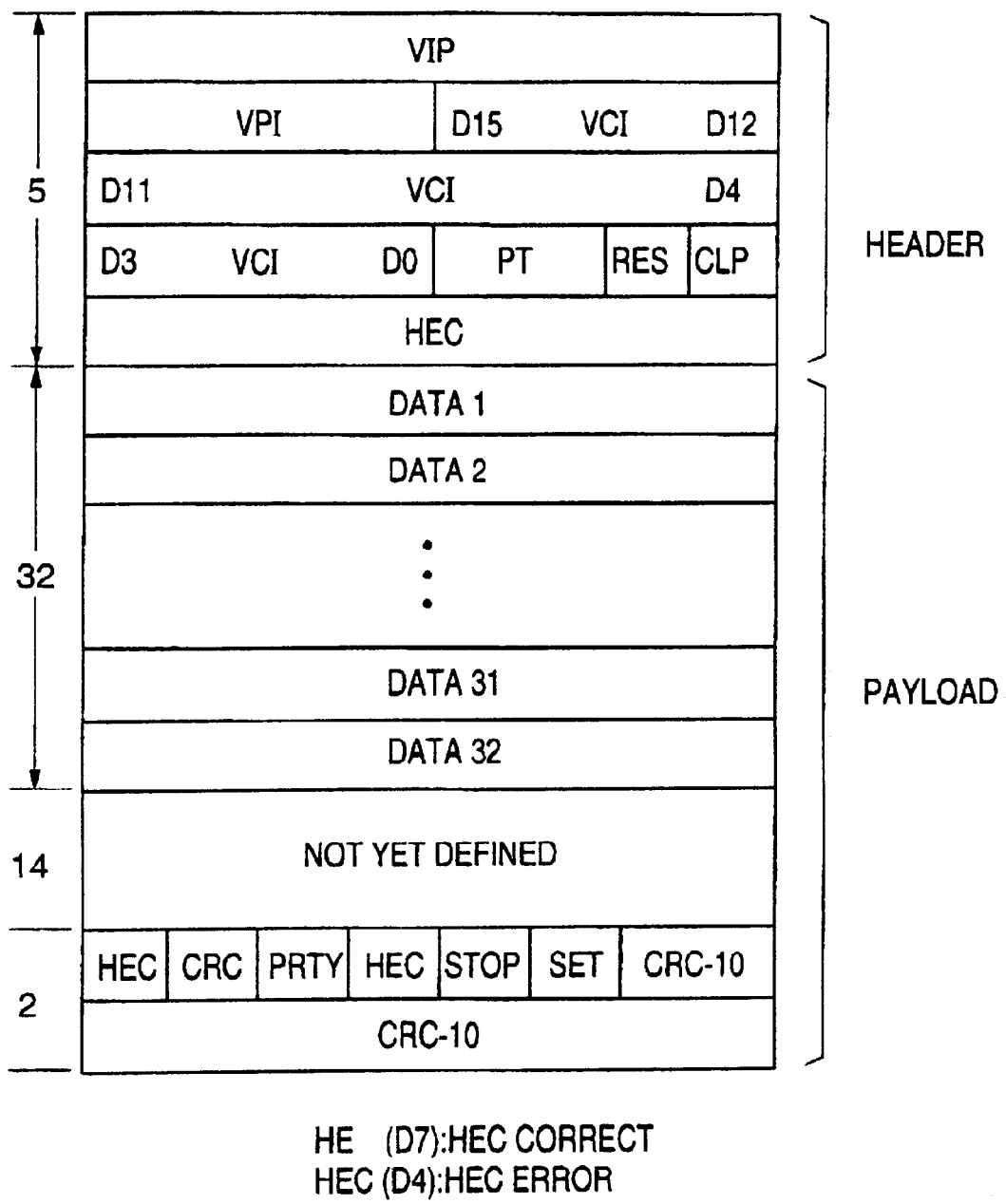
FIG. 12 is a flowchart of a process for receiving an ATM cell having OSC information in the OH processing part according to the embodiment of the present invention.

The ATM link 6 connecting the ATM routing part 4 and the supervisory control block 5 is a 155 Mbps transmission path. FIG. 12 shows a format of the ATM cell transferred over the ATM link 6. The ATM cell has a header field of 5 bytes, and a payload field of 48 bytes. Symbols given in the header field are as follows:

VPI: virtual path identifier
VCI: virtual channel identifier
PT: payload type field
RES: reserve field
CLP: cell loss priority field
HEC: header error control field.

By using the virtual channel identifier VCI included in the 5-byte header field, the supervisory control block 5 can determine what data is included in the payload of the ATM cell, more particularly, which one of the unit name, OH information, new OH information (OSC information), control and condition data is included in the payload of the ATM cell.

The first 32 bytes among 48 bytes of the payload area are data presented to the normal I/O areas. The subsequent 14 bytes carry OH (overhead) data (not presented to the I/O areas) such as order wire or DCC, which changes every 8 kHz. The last two bytes carry a CRC for checking an error which occurs in the payload field. In the above manner, the OSC information is arranged in the payload field when the ATM cell carries the OSC information (new OH information).

As shown in FIG. 4, the supervisory control block 5 includes an ATM polling part 51 and a supervisory control CPU part 52. The supervisory control CPU part 52 is separated into an upper-layer CPU 52A and a lower-layer CPU 52B. The ATM polling part 51 includes an ATM polling processing part 511 and an OH matrix part 512. Various OSC bytes are terminated at the ATM polling processing part 511, and a variety of information including the terminated information is transferred between the ATM polling processing part 511 and the upper-layer CPU 52A via a UAB bus. Some bytes such as DCC and order wire are terminated at the OH matrix part 512, and information such as DCC and order wire is transferred between the OH matrix part 512 and the lower-layer CPU 52B.

In the ATM polling part 51, the OSC information included in the payload of the received ATM cell is extended in the memory, and a data change point is detected. When a data change point is detected, the supervisory control CPU 52 is notified of the address of the detected data change point. Hence, the ATM polling part 51 can send an interruption to the supervisory control CPU part 52 only when a change occurs in the data.

When a control such as provisioning is carried out for the main signal group, the supervisory control CPU part 52 which receives the interruption from the ATM polling part 51 triggers the ATM polling part 51. Then, the ATM polling part 51 assembles control data necessary for control such as provisioning into an ATM cell, which is sent to the ATM link 6.

Figure 13:
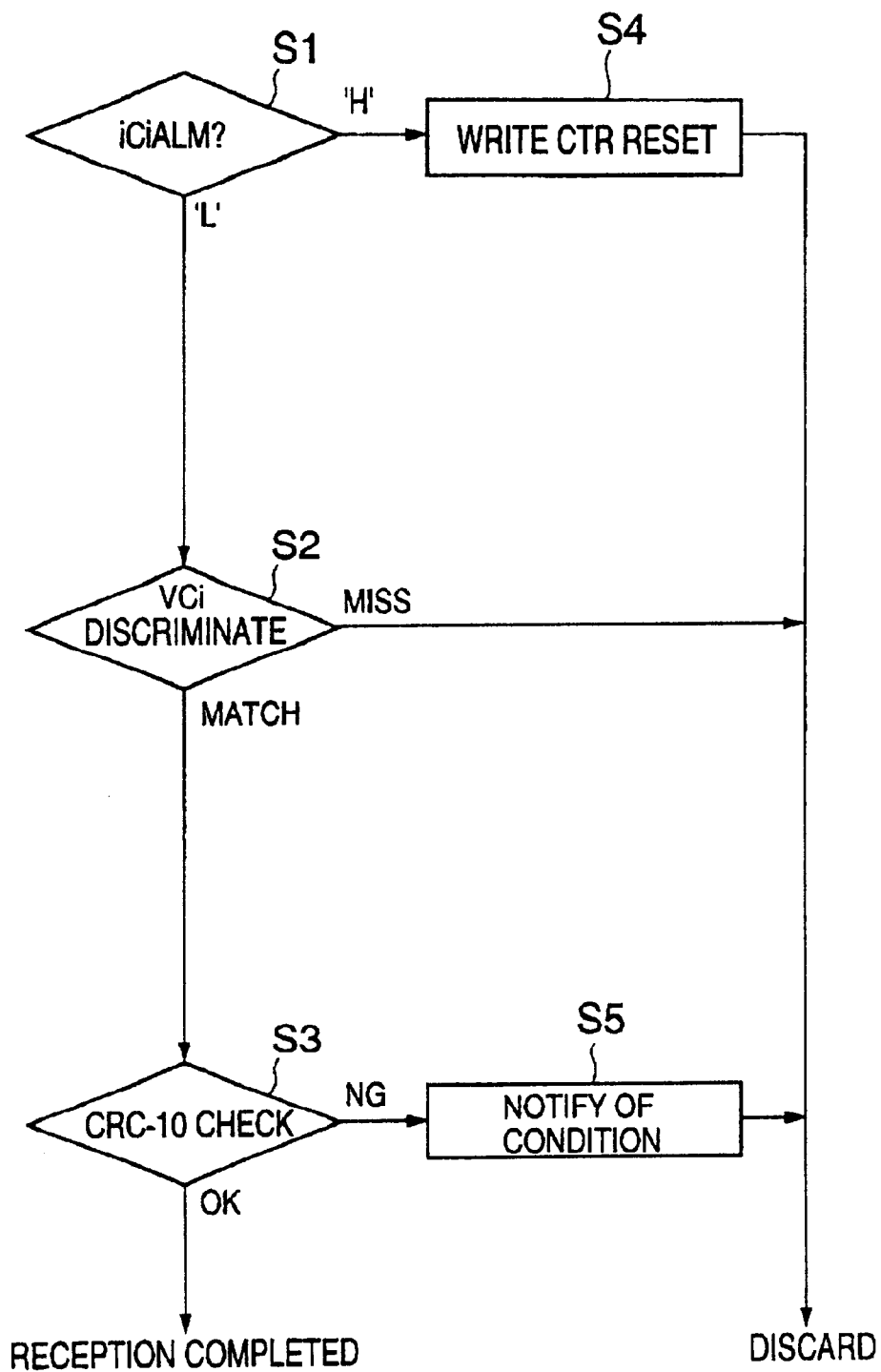
FIG. 13 is a block diagram of a detailed structure of a reception system of the OH processing part.

FIG. 13 schematically shows a process for receiving, in the OH processing part 431 of the ATM routing part 43 of the main signal block 4, the ATM cell having the OSC information sent by the ATM polling part 51 of the supervisory control block 5.

At step S1, the OH processing part 431 discriminates the contents of iCiALM data (indicating abnormality in the ATM link) of the ATM cell having the OSC information received by the ATM routing part 43. If the ICIALM data indicates abnormality "H", the received ATM cell data including the OSC information is discarded, and the data received at the last time is sent to the OSC frame generation/termination parts 42A and 42B of the optical amplifier parts 41A and 41B. In the above manner, the OSC information is fixed to that based on the ATM cell normally received just before occurrence of abnormality. Hence, it is possible to prevent erroneous information from being arranged in the OSC frame in the OSC frame generation/termination parts 42A and 42B.

If the ICIALM data indicates normality "L", the OH processing part 431 executes step S2. More particularly, the OH processing part 431 refers to the value of the virtual channel identifier VCI included in the header of the ATM cell having the OSC information, and determines whether the received ATM cell corresponds to the ATM cell having the OSC information or another type of ATM cell. If it is judged that the received ATM cell is an ATM cell of another type, the received ATM cell is discarded.

If it is judged that the received ATM cell is the ATM cell having the OSC information, the OH processing part 431 performs an error checking operation on the received ATM cell using the CRC-10 at step S3. If a CRC-10 error is detected, the received ATM cell is discarded and CRC-10 error information is immediately mapped into the ATM cell, which is then sent to the supervisory control block 5. Hence, the supervisory control block 5 can obtain information indicative of the quality of ATM cell information of the OSC.

Various variations and modifications can be made in order to carry out the present invention. Some variations and modifications will be described below.

In the above-mentioned embodiment of the present invention, the ATM link 6 connects one main signal block 4 and one control block 5. Alternatively, the ATM link 6 may be modified so as to connect a plurality of main signal blocks 4 to the supervisory control block 5. In this case, the ATM polling processing part 511 of the supervisory control block is modified so as to have a plurality of ports, which are connected to the respective main signal blocks 4 via the ATM link 6.

There is no need to provide the main signal block 4 and the supervisory control block 5 at the same frame in an office station. For example, the main signal block 4 and the supervisory control block 5 may be located a distance apart and may be connected via the ATM link 6.

In the aforementioned embodiment of the present Invention, the ATM link 6 is used to connect the main signal block 4 and the supervisory control block 5. Alternatively, another type of transmission can be employed to connect the main signal block 4 and the supervisory control block 5.

Figure 14:
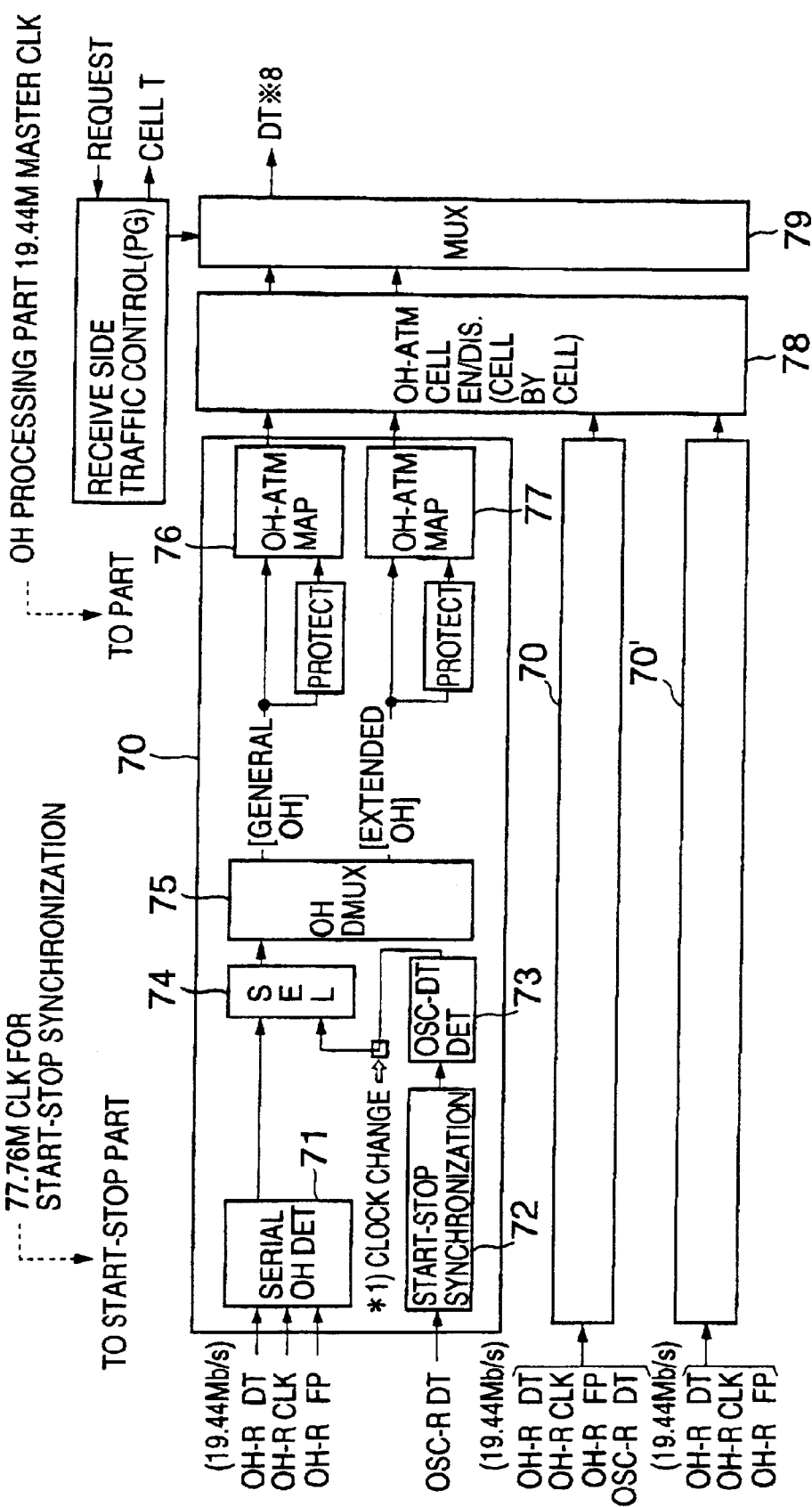
FIG. 14 is a block diagram of a detailed structure of a transmission system of the OH processing part.
Figure 15:
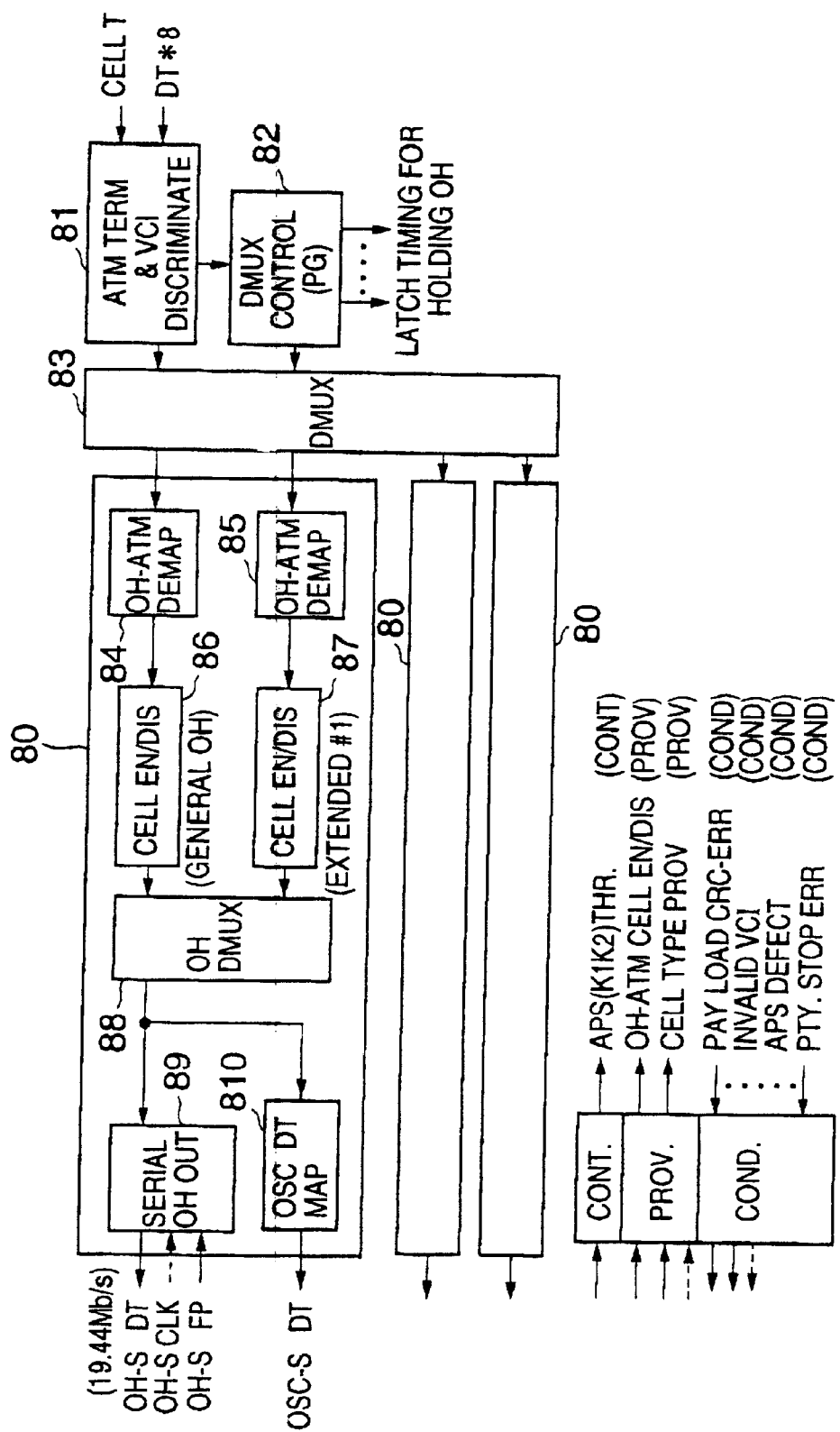
FIG. 15 is a diagram showing coexistence of a WDM system and an ordinary optical transmission system.

FIGS. 14 and 15 show a more detailed structure of the OH processing part 431. More particularly, FIG. 14 shows reception circuits 70 receiving the OSC and OH information. The reception circuits 70 have the same structure as each other and are arranged in parallel formation. FIG. 15 shows transmission circuits 80 transmitting the OSC and OH information. The transmission circuits 80 have the same structure as each other and are arranged in parallel formation.

Referring to FIG. 14, each of the reception circuits 70 has two systems, one of which systems receives the OSC information and the other receives the OH information. The OSC information from the OSC interface 45 is received by a start-stop synchronization system 72 and an OSC information detecting part 73. The OH information from the OH interface 47 is received by a serial OH detecting part 71. The received information is passed through a selector 74 and is applied to an OH demultiplexer 75 into individual items of data. The individual items of data of the ordinary new OH information (OSC information) or OH information are distributed to an OH-ATM mapping part 76, which maps the individual items of data in the ATM cell. Individual items of data of the OH information for extension are distributed to an OH-ATM mapping part 77, which maps the individual items of data into the ATM cell. The outputs of the OH-ATM mapping parts 76 and 77 are input to an OH-ATM cell EN/DIS (enable/disable) part 78, and are then input to a multiplexer 79. The multiplexer 79 multiplexes ATM cell data from the plurality of reception circuits 70, and outputs multiplexed data to the ATM routing processing part 432.

A reception circuit 70' shown in FIG. 14 receives the OH information only.

Referring to FIG. 15, each of the transmission circuits 80 has two systems, one of which systems transmits the OSC information and the other transmits the OH information. The ATM cell received from the ATM routing processing part 432 is received by an ATM term/VCI discrimination part 81, and is then input to a demultiplexer 83. The demultiplexer 83 demultiplexes the ATM cell into individual items of data. The data on the ordinary OSC information or OH information is transferred from an OH-ATM demapping part 84 to an OH multiplexer part 88 via a cell enable/disable (EN/DIS) part 86. The data of the OH information for extension is transferred from an OH-ATM demapping part 85 to the OH multiplexer part 88 via a cell enable/disable (EN/DIS) part 87. The OH information multiplexed in the OH multiplexer part 88 is sent to the OH interface 47 from a serial OH output part 89. The OSC information (new OH information) multiplexed in the OH multiplexer part 88 is mapped into an OSC information mapping part 810, and is then sent to the OSC interface part 45.

According to the present invention, the supervisory control block can commonly be used for the OSC processing in the WDM system and the overhead process in the ordinary optical transmission system. Thus, the load (software processing load) on the CPU in the supervisory control block can be reduced and the cost can be drastically reduced.

By mapping the OSC information in the ATM cell and sending it to the supervisory control block, the OSC information in the WDM system can be processed in a highly integrated formation. This contributes to suppressing an increase in the number of signal lines and avoiding the multilayer formation of boards in the interface part.

In addition, the OSC information process can be executed at a higher speed by employment of hardware which performs the process which was conventionally processed by software.

The present invention is not limited to the specifically disclosed embodiments, and variations and modifications may be made without departing from the scope of the invention.

What is claimed is:

1. A control device for processing an optical supervisory transmission signal necessary for network management between transmission devices in a wavelength-multiplexed optical transmission system, said control device comprising:

a main signal device that amplifies a main signal light which is wavelength-multiplexed;

a supervisory control device that processes supervisory control information; and a transmission path connecting the main signal device and the supervisory control device, the supervisory control information being defined by mapping items of data of the optical supervisory transmission signal into an overhead defined in another optical transmission system, the main signal device converting the optical supervisory transmission signal dropped from the main signal light into the supervisory control information, which is sent to the supervisory control device, the supervisory control device processing the supervisory control information received as the overhead.

2. The control device as claimed in claim 1, wherein the main signal device comprises:

a generation/termination part which performs a conversion between the supervisory control information and the optical supervisory transmission signal; and a transmission part which transfers the supervisory control information between the main signal device and the supervisory control device, wherein an interface between the generation/termination part and the transmission part includes a start-stop synchronization in which a start bit, a parity bit and a stop bit are added to the supervisory control information.

3. The control device as claimed in claim 1, wherein the transmission path is an ATM transmission path over which an ATM cell is transferred between the main signal device and the supervisory control device.

4. The control device as claimed in claim 1, wherein the main signal device receives an ATM cell in which the supervisory control information is arranged from the supervisory control device, and sends the supervisory control information arranged in the received ATM cell to a generation/termination part of the main signal device, which supervisory control information corresponds to information arranged in a header of the received ATM cell.

5. The control device as claimed in claim 1, wherein the main signal device comprises:
- a first part that receives an ATM cell in which the supervisory control information is arranged from the supervisory control device;
- a second part that determines whether a fault has occurred in the transmission path by referring to a fault detection signal related to the transmission path and included in the ATM cell; and
- a third part that fixes, if occurrence of a fault is detected, the supervisory control information to be sent to a generation/termination part of the main signal device to that obtained before the fault occurred.

6. The control device as claimed in claim 1, wherein the main signal device comprises:
- a first part that receives an ATM cell in which the supervisory control information is arranged from the supervisory control device;
- a second part that determines whether a fault has occurred in the transmission path by referring to error check data included in the ATM cell; and
- a third part that maps, if an error is detected, error information in an ATM cell, which is sent to the supervisory control device.

7. A control device for processing an optical supervisory transmission signal necessary for network management between transmission devices in a wavelength-multiplexed optical transmission system, said control device comprising:
- a main signal device that amplifies a main signal light which is wavelength-multiplexed;
- a supervisory control device that processes supervisory control information; and
- a transmission path connecting the main signal device and the supervisory control device,
- the supervisory control information being defined by mapping items of data of the optical supervisory transmission signal into an overhead defined in another optical transmission system,
- the main signal device converting the optical supervisory transmission signal dropped from the main signal light into the supervisory control information, which is sent to the supervisory control device,
- the supervisory control device processing the supervisory control information received as the overhead,
- the main signal device converting the supervisory control information received from the supervisory control device into the optical supervisory transmission signal, which is added to the main signal light.

8. The control device as claimed in claim 7, wherein the main signal device comprises:
- a generation/termination part which performs a conversion between the supervisory control information and the optical supervisory transmission signal; and
- a transmission part which transfers the supervisory control information between the main signal device and the supervisory control device,
- wherein an interface between the generation/termination part and the transmission part includes a start-stop synchronization in which a start bit, a parity bit and a stop bit are added to the supervisory control information.

9. The control device as claimed in claim 7, wherein the transmission path is an ATM transmission path over which an ATM cell is transferred between the main signal device and the supervisory control device.

10. The control device as claimed in claim 7, wherein the main signal device receives an ATM cell in which the supervisory control information is arranged from the supervisory control device, and sends the supervisory control information arranged in the received ATM cell to a generation/termination part of the main signal device, which supervisory control information corresponds to information arranged in a header of the received ATM cell.

11. The control device as claimed in claim 7, wherein the main signal device comprises:
- a first part that receives an ATM cell in which the supervisory control information is arranged from the supervisory control device;
- a second part that determines whether a fault has occurred in the transmission path by referring to a fault detection signal related to the transmission path and included in the ATM cell; and
- a third part that fixes, if occurrence of a fault is detected, the supervisory control information to be sent to a generation/termination part of the main signal device to that obtained before the fault occurred.

12. The control device as claimed in claim 7, wherein the main signal device comprises:
- a first part that receives an ATM cell in which the supervisory control information is arranged from the supervisory control device;
- a second part that determines whether a fault has occurred in the transmission path by referring to error check data included in the ATM cell; and
- a third part that maps, if an error is detected, error information in an ATM cell, which is sent to the supervisory control device.

* * * * *